UNITED STATES PATENT OFFICE.

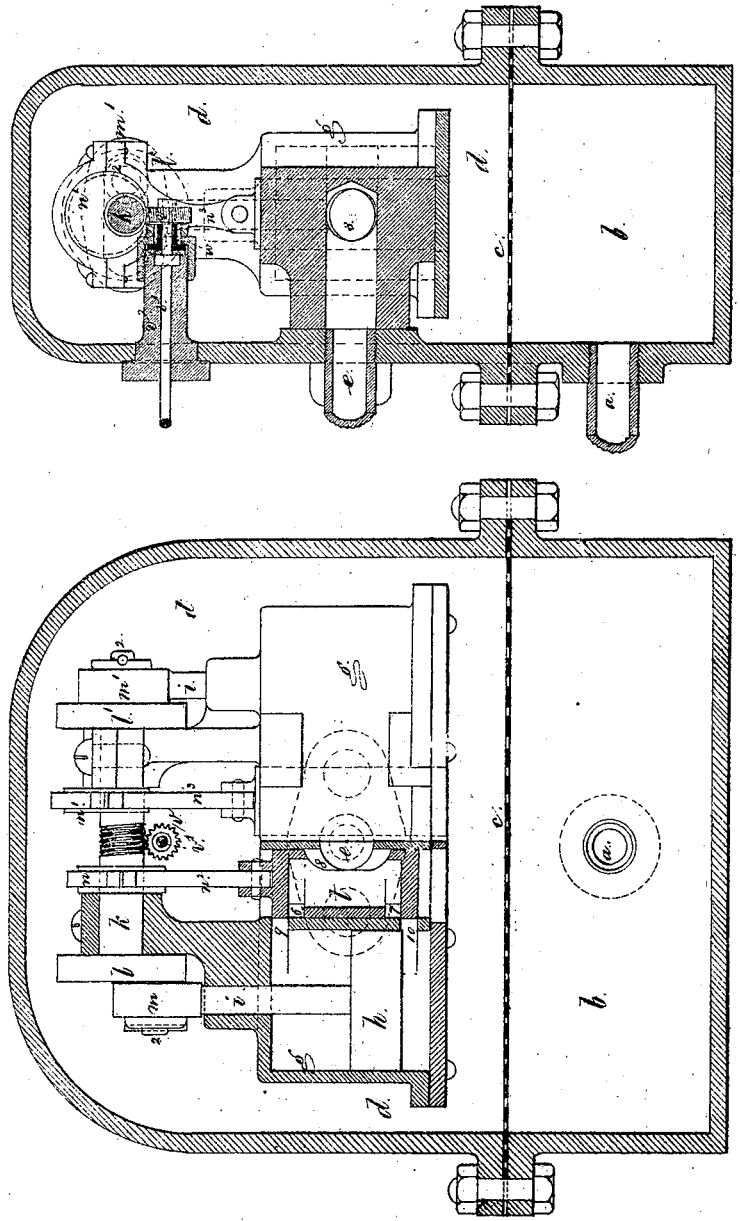

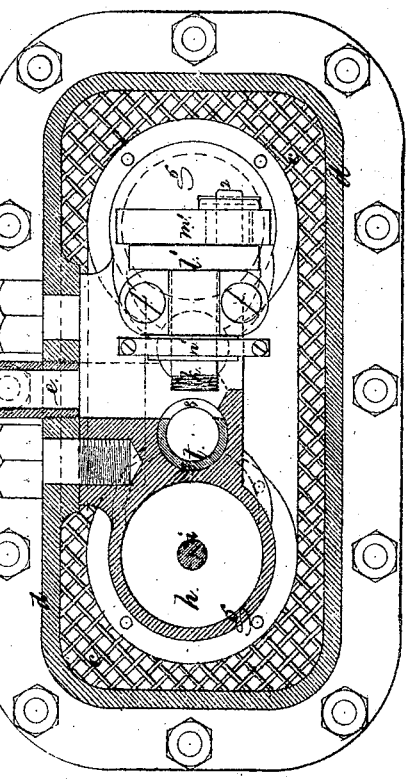
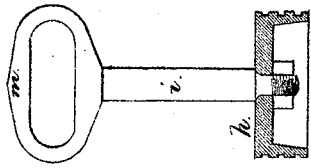

DAVID P. DAVIS, OF JERSEY CITY, NEW JERSEY.

IMPROVEMENT IN METERS.

Specification forming part of Letters Patent No. 118,112, dated August 15, 1871.

*To all whom it may concern:*

Be it known that I, DAVID P. DAVIS, of Jersey City, in the county of Hudson and State of New Jersey, have invented and made an Improvement in Water-Meters; and the following is declared to be a correct description of this invention.

In water-meters heretofore made difficulty has arisen from friction and unbalanced pressure, lessening the effective force or head of water after passing such meter.

The object of this invention is to balance the pressure of water on the parts, lessen friction, simplify construction, and obtain accuracy of measurement by an apparatus that is cheap and durable.

In the drawing, Figure 1 is a vertical longitudinal section of the case and one side of the measuring apparatus, the other side being in elevation. Fig. 2 is a vertical central cross-section. Fig. 3 is a sectional plan of the case and of one side of the apparatus, the other side of the apparatus not being in section; and Fig. 4 is a detached elevation of the piston and rod of one of the cylinders.

The case in which this apparatus is placed is of any suitable size and shape. I prefer and use one similar to that shown, in which the water is admitted by the pipe $a$ into the lower part $b$ of the case and below the screen or perforated plate $c$, that acts to keep any foreign substance from the meter that is contained in the upper part $d$ of said case, and from this the escape-pipe $e$ passes. The parts of the case may be bolted together, as shown, or in any other convenient manner.

I make use of two cylinders, $g$ $g$, that are of suitable size and adapted to receive the pistons $h$ and rods $i$, which latter pass through holes in the upper ends of the cylinders and fit the same so as to be nearly or quite water-tight; but packing will not be necessary around the piston-rod, as the pressure is nearly equal on each side of the joints. The shaft $k$ is provided with cranks $l$ $l'$ at the ends, and said cranks should be set at about ninety degrees apart, so that one engine is in full work when the other is passing the center. The heads $m$ $m'$ of the piston-rods $i$ are slotted transversely to receive the crank-pins 2 2, which may be made with rollers upon such pins to lesssen friction, if desired. Upon the shaft $k$ eccentrics $n$ $n^1$ are placed that work the valves with the usual lead, so as to insure the proper direction of motion, as in a steam-engine. The eccentric rods $n^2$ $n^3$ are connected to the valves, and these valves are of peculiar construction. The metal adjoining the cylinder is made with cylindrical openings to receive the valves $t$ $t$, and these valves are formed of hollow cylinders, with ports 6, 7, and 8, and the main cylinders $g$ $g$ are made with ports 9 and 10, so that the water or liquid passes in through the port 10 when the cylindrical valve $t$ is moved so as to uncover said port, and at the same time the liquid passes out from the other end of the cylinder by the ports 9 and 6 and delivery-port 8 and pipe $e$. After the crank-pin 2 has passed the highest point and the piston $h$ commences to descend, the eccentric has moved the valve $t$, so that water passes in through the port 9 and is delivered through the ports 10 and 7, valve $t$, and pipe $e$.

Cams may take the place of eccentrics for actuating the valves, and said cams may act in slots transversely of the valve-rods.

It will be seen that by this construction the pressure of water is entirely balanced, and acts with equal force in opposite directions on the piston, and upon both the inside and outside of the moving valve $t$. The parts are also of such character that they will operate with very little friction or wear, being lubricated by the water itself, and, although no packing is required and the parts may not be absolutely tight, still the leakage, if any, will be so small as not to be noticeable in measuring the flow of water.

The construction of the meter is inexpensive, as almost all the finishing is lathe-work and can be done to a standard pattern.

The shaft $k$ has a worm or screw around it, taking the pinion $v$ that is at the end of a shaft, $v^1$, passing to the registering apparatus. This shaft is in a sleeve, $v^2$, that is of a size to fill and cover by its flange the hole in the case $d$, through which the said pinion $v$ is introduced, so that it may be removed for clearing or setting without taking the meter-case apart. The cup-leather $w$ forms a packing for the shaft $v^1$.

I claim as my invention—

1. The valves $t$, made of hollow cylinders closed at the ends and having ports 6, 7, and 8 in the sides, and introduced in the open cylinders provided with ports 9 and 10 and pipe $e$, in combination with the cylinders $g$, pistons $h$, shaft $k$, and connections, substantially as and for the purposes set forth.

2. The removable sleeve $v^2$, carrying the shaft $v^1$, packing, and worm-pinion, constructed as specified, and inserted into the case of the water-meter, as and for the purposes set forth.

Signed by me this 20th day of October, A. D. 1870.

D. P. DAVIS.

Withesses:
GEO. D. WALKER,
CHAS. H. SMITH.